United States Patent [19]
Day

[11] 3,748,855
[45] July 31, 1973

[54] REACTOR AIR FLOW CONTROL VALVE

[75] Inventor: Edward G. Day, Rochester, N.Y.

[73] Assignee: General Motors Corporation, Detroit, Mich.

[22] Filed: Apr. 20, 1972

[21] Appl. No.: 245,993

[52] U.S. Cl. .................................................. 60/290
[51] Int. Cl. ............................................ F02b 75/10
[58] Field of Search .............................. 60/289, 290

[56] References Cited
UNITED STATES PATENTS

| | | | |
|---|---|---|---|
| 3,086,353 | 4/1963 | Ridgway | 60/290 |
| 3,203,168 | 8/1965 | Thomas | 60/290 |
| 3,364,909 | 1/1968 | Mick | 60/290 |
| 3,430,437 | 3/1969 | Saussele | 60/290 |
| 3,433,242 | 3/1969 | Voorheis | 60/290 |

Primary Examiner—Douglas Hart
Attorney—J. L. Carpenter and Arthur N. Krein

[57] ABSTRACT

A reactor air flow control valve for use in the exhaust reactor system of an internal combustion engine of the type in which an engine driven air pump delivers air to the stream of exhaust gases as they are emitted from the combustion chambers, the valve controlling air flow from the air pump to the exhaust reactor system as a function of reactor temperatures and back pressure.

10 Claims, 3 Drawing Figures

PATENTED JUL 31 1973  3,748,855

REACTOR AIR FLOW CONTROL VALVE

This invention relates to a control valve and, in particular, to an air flow control valve for controlling air flow to the exhaust reactor system of an internal combustion engine.

In recent years, increased emphasis has been placed on reducing the proportion of unburned constituents, such as hydrocarbons and carbon monoxide present in the exhaust gases emitted from internal combustion engines. One of the most effective arrangements devised to accomplish this reduction is the air injection exhaust reactor system. In this system, an engine driven air pump delivers air to the stream of hot exhaust gases as they are emitted from the engine combustion chambers. Utilizing the heat of the exhaust gases, the injected air supports additional burning of the exhaust gases in the engine exhaust passages to reduce the proportion of unburned constituents in the exhaust gases.

Such an air injection exhaust reactor system having an air flow control valve associated therewith may be of the type as shown in U.S. Pat. No. 3,364,909 issued Jan. 23, 1968 to Stanley H. Mick. In this system, the air flow control valve is used to control the flow of air from an engine driven air pump to the exhaust reactor system so that during periods of engine deceleration, air is diverted from the exhaust reactor system to the intake manifold of the engine thereby leaning the mixture delivered to the engine to permit more complete combustion and reduce the proportion of unburned material exhausted from the combustion chambers.

Although an air flow control valve of the type disclosed in the above-identified U.S. Pat. No. 3,364,909 is useful to reduce the proportion of unburned material exhausted from the combustion chambers of the engine during deceleration, for other reasons excessive amounts of unburned combustible material may be exhausted from the combustion chambers of the engine. These excessive amounts of unburned materials when mixed and burned with uncontrolled amounts of additional air can raise the temperature excessively in the engine exhaust system so as to cause damage to various elements of the exhaust reactor system and, especially, for example, to a catalytic converter if used as part of a total engine exhaust reactor system.

It is therefore the principal object of this invention to provide a reactor air flow control valve for controlling air flow to the exhaust reactor system of an internal combustion engine as a function of both exhaust reactor temperatures and back pressure and of engine operating conditions.

Another object of this invention is to improve a reactor air flow control valve for an internal combustion engine to provide timed intake manifold injection of air to prevent backfire on engine deceleration and to control the pressure and flow of air to the exhaust reactor as a function of reactor temperature and back pressure.

These and other objects of the invention are attained by means of a reactor air flow control valve which combines a gulp-type anti-backfire valve in a unit with a diaphragm operated pressure relief valve, the diaphragm being responsive to pressures controlled by a thermostatically controlled bleed from the air pump outlet, the thermostat being responsive to exhaust reactor temperatures.

For a better understanding of the invention, as well as other objects and further features thereof, reference is had to the following detailed description of the invention to be read in connection with the accompanying drawings, wherein.

Figure 1:
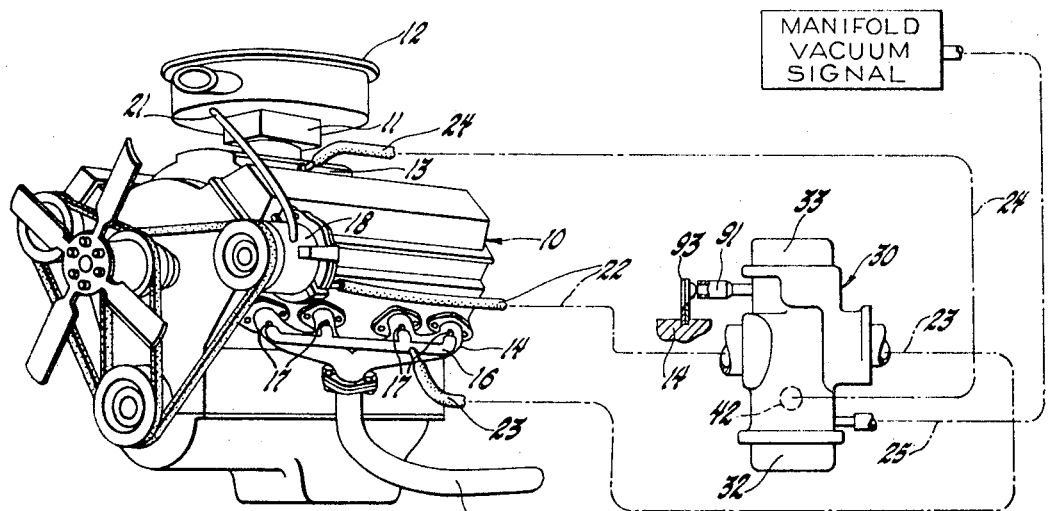
FIG. 1 is a view of an internal combustion engine which includes an air pump to inject air into the exhaust passages and which also includes a reactor air flow control valve in accordance with the invention.
Figure 3:
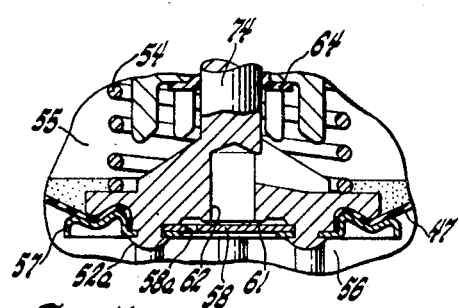

Referring now to FIG. 1, there is illustrated an internal combustion engine 10, shown as a V-8 engine for purpose of illustration only, which is provided with a carburetor 11 and an air cleaner 12 thereon mounted to supply an air-fuel mixture to the intake manifold 13 of the engine. Each bank of cylinders of the engine is provided with an exhaust manifold 14 connected to an exhaust pipe 15 which in turn may be connected to a catalytic converter, not shown. Each of the exhaust manifolds has an air injection or induction unit in the form of an air manifold 16 positioned adjacent to it which is provided with a series of passages in injection tubes 17 extending into the exhaust manifold 14 and terminating downstream of and closely adjacent to the exhaust valve in each of these cylinders, not shown, whereby air delivered through these injection tubes is injected into the stream of exhaust gases or combustibles flow paths adjacent to each of the exhaust valves in the combustion chambers. An air pump 18 is driven by the engine to draw clean air through conduit 21 from the air cleaner 12 and deliver the air as controlled by the reactor air flow control valve 30 of the invention.

As shown in FIG. 1, the control valve 30 is connected by a conduit 22 to the discharge side of the air pump 18 and by conduit 23 to the air manifold 16, a connection to only one manifold being shown schematically in FIG. 1. The control valve 30 is also connected by a conduit 24 to the intake manifold so that under certain operating conditions, part of the air output from the air pump 18 can be diverted to the intake manifold 13 at a point below the throttle valve, not shown, of this induction system, a chamber being provided within the control valve 30 and connected by a conduit 25 to the intake manifold to receive a manifold vacuum signal to control the injection of air to the intake manifold as a function of engine operating conditions in a manner to be described. In addition, a dump valve, to be described, is positioned in the control valve to dump excess air from the air pump to the atmosphere.

Figure 2:
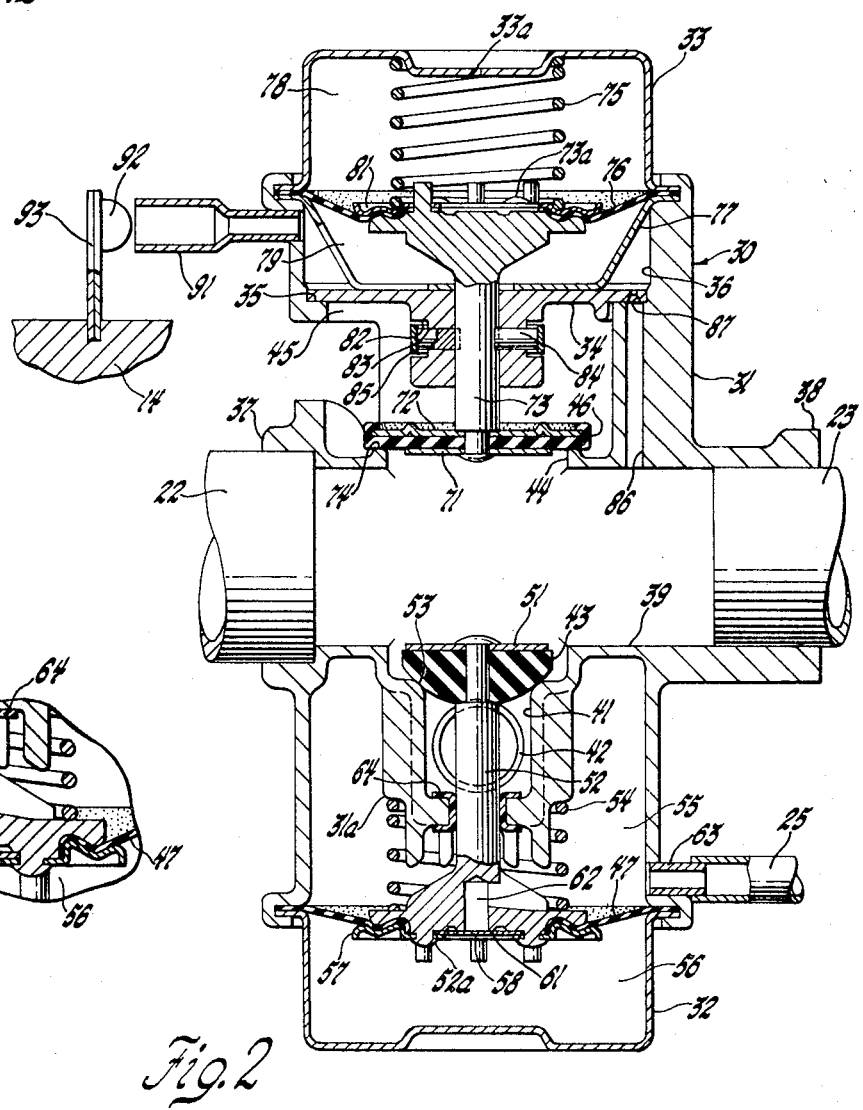
FIG. 2 is an enlarged sectional view of the reactor air flow control valve of the invention; and, FIG. 3 is an enlarged view of the bleeder arrangement of the structure of FIG. 2 which times the period during which air is injected into the induction system of the engine.

Referring now to FIG. 2, the control valve 30, in the embodiment illustrated, consists of a multiple piece housing including a valve body 31, opposed covers 32 and 33 and a stem guide 34 mounted on the annular shoulder 35 of a cavity within the valve body. The valve body 31 forming an air manifold is provided with an inlet 37 and an outlet 38 connected by a through passage 39, with the inlet 37 and the outlet 38 connected to conduits 22 and 23, respectively, so that air from the air pump 18 normally flows to the air manifold 16 with minimum restriction through the valve body. Valve body 31 also includes a passage 41 in communication at one end with passage 39 and at its opposite end through a port 42 and conduit 24 with the intake manifold 13 whereby air from air pump 18 can be injected into the intake manifold to prevent backfire on engine deceleration. Air flow from passage 39 to passage 41 is controlled by a gulp valve 43 in a manner to be described in detail hereinafter. The connection of conduit 24 to intake manifold 13 is made downstream of the throttle valve, not shown, in the engine induction system so that air may be bled into the induction systm when the throttle valve is closed during engine deceleration. In addition, valve body 31 includes a passage 44 in communication at one end with passage 39 and at its opposite end through dump port 45 with the atmosphere. Air flow from passage 39 throFgh passage 44 is controlled by a relief or dump valve 46, in a manner to be described.

In order to prevent backfire, the gulp valve 43 is connected for actuation by a pressure responsive diaphragm 47 which will effect unseating of the gulp valve to bypass air from the air pump 18 into the intake manifold 13 of the engine. Intake manifold vacuum is supplied to the upper side of the diaphragm 47 so that during deceleration, the high induction vacuum will, in effect, pull the diaphragm upward to effect opening of the gulp valve 43. A timing valve is used in connection with this diaphragm to gradually effect a balance of pressure on opposite sides of this diaphragm so that the gulp valve 43 is opened only for a predetermined interval.

Air flow from passage 39 through passage 41 to the intake manifold is controlled by the gulp valve 43 which is secured by the retainer 51 to the stepped stem of a valve stem 52. The gulp valve 43 is adapted to close against a valve seat 53 in the valve body and is normally held in a closed position with respect to this seat by a spring 54 which encircles the valve stem with one end of the spring engaging the annular base of the valve stem and the other end abutting against an annular shoulder 31a of the valve body.

Movement of the gulp valve 43 from the closed position shown in FIG. 2 to an open position, not shown, is effected by means of the diaphragm 47. The outer periphery of the diaphragm 47 is sealingly clamped between the valve body 31 and cover 32 to form therewith first and second chambers 55 and 56, respectively. Diaphragm 47 is provided with a central circular opening and is clamped between the annular base of the valve stem 52 and a centrally apertured retainer 57 which encircles the diaphragm around the opening therein and which is staked in place by means of pins 52a protruding from the annular base of the valve stem.

Communication between the two chambers 55 and 56 is controlled by means of a timing valve 58 also held in position by the retainer 57 against the bottom of the annular base of the valve stem 52. Valve 58, which is a disc of flexible material, is provided with an arcuate slot 58a therein to form a flapper bleed valve portion which overlies an annular recess in the annular base of the valve stem 52 with the arcuate slot therein in communication via one or more bleed grooves 61 and a passage 62 in the annular base of the valve stem with the chamber 55. A conduit 63 connects chamber 55 via hose conduit 25 to the intake manifold of the engine induction system.

During engine deceleration, the high induction vacuum pulls diaphragm 47 upwardly against the bias of spring 54 to cause valve 43 to unseat from the valve seat 53, thus allowing the flow of air from the air pump 18 into passage 39 to flow to the intake manifold, thus reducing or eliminating the flow of air to the air manifold 16. A seal 64 surrounds the valve stem 52 to separate passage 41 from chamber 55. If the seal were not present, air flow from passage 41 would bleed into chamber 55 and reduce the vacuum causing the diaphragm 47 to flutter and valve 43 to chatter.

As previously described, during engine deceleration, a high vacuum raises diaphragm 47 to open valve 43. At the same time, the timing valve 58 is closed but air can bleed between chambers 55 and 56 through the bleed grooves 61, previously described. After a period of time determined by the size of the bleed grooves, the pressure in chambers 55 and 56 will be sufficiently balanced so that the spring 54 will lower the valve 43 into engagement with the valve seat 53. The size of the bleed grooves 61 are selected so that balancing of pressure between chambers 55 and 56 will occur over a predetermined time interval so that valve 43 is open only for this time interval.

If, however, before the pressure in chamber 55 is balanced with that in chamber 56, the engine is suddenly accelerated, the pressure in intake manifold 13 and therefore in chamber 55 will rise rapidly. If this occurs, the timing valve 58 will open placing chambers 55 and 56 in communication with each other whereby the pressure in the chambers 55 and 56 may be quickly balanced with respect to each other so that, in effect, valve 43 is closed and maintained closed by spring 54.

Air flow from passage 39 through passage 44 for discharge to the atmosphere is controlled by the dump valve 46 which is secured by retainers 71 and 72 on opposite sides thereof to the stepped stem of valve stem 73 journalled in stem guide 34. The dump valve 46 is adapted to close against a valve seat 74 in the valve body and is normally held in a closed position with respect to this seat by a regulator spring 75 positioned between the annular base of the valve stem 73 and the frusto-conically shaped embossment of cover 33.

Movement of the dump valve 46 from the closed position shown in FIG. 2 to an open position, not shown, is effected by means of diaphragm 76 sealingly clamped at its outer periphery, together with an apertured guide holder 77, between the valve body 31 and cover 33 to form therewith upper and lower chambers 78 and 79, respectively. Diaphragm 76 is clamped between the annular base of valve stem 73 and a retainer 81 staked to the valve stem by pins 73a protruding from the annular base of the valve stem. Stem guide 34 is provided with an external annular groove 82 and circumferentially spaced radial apertures 83 to slidably receive damper pins 84 held in position against valve stem 73 by an annular split spring clip 85.

Chamber 79 is in communication with the flow of air from air pump 18 into passage 39 by means of a passage 86 in valve body 31 and an orifice 87 in the annular flange portion of stem guide 34 and is in communication with the atmosphere by a sized conduit 91. The discharge of air from the sized conduit 91 is controlled by a temperature sensing circuit which, in the embodiment dislcosed, consists of a throttle valve 92 fixed to the free end of a bimetallic thermostat element 93 which is secured at its opposite end in thermal contact with a thermal element of the exhaust system, such as with the exhaust manifold 14 of the engine. The thermostat element 93 is positioned so that with increasing temperature it will move throttle valve 92 in a clockwise direction, as seen in FIG. 2, toward the free end of sized conduit 91 to restrict the discharge of air through this conduit from lower chamber 79 to the atmosphere.

In operation, dump valve 46 is used as a relief or pressure regulating valve to control the pressure of air flowing through passage 39 from air pump 18 to the air manifold 16 of the reactor to a pressure, for example, of five (5) pounds per square inch gage, with a dump down mode of operation operative at a lower pressure, of for example one and one-half (1.5) pounds per square inch gage upon the proper signal from the reactor temperature sensing circuit.

In the normal mode of operation, the sized conduit 91 is uncovered, as shown in FIG. 2, so that a small amount of the air pump 18 output into passage 39 flows through passage 86 as controlled by orifice 87 into the lower chamber 79 and then to the atmosphere through the sized conduit 91. Under these operating conditions, the pressure in lower chamber 79 will be less than the pressure of the air flowing through passage 39 to the reactor. In effect, the pressure in lower chamber 79 will be at or slightly higher than atmospheric pressure and the pressure on the opposite side of diaphragm 76 in upper chamber 78 being atmospheric since this chamber is vented to the atmosphere by aperture 33a in cover 33.

The pressure of the air in passage 39 and the pressure of air in lower chamber 79 create an upward force on the dump valve assembly according to the following equation:

$$F_{dva} = P_{39}A_{46} + P_{79}A_{76}$$

wherein $F_{dva}$ is the upward force on the dump valve assembly and wherein $P_{39}$ is the pressure of air in passage 39 working on the working area $A_{46}$ of dump valve 46 and wherein $P_{79}$ is the pressure of the air in lower chamber 79 and $A_{76}$ is the effective working area of diaphragm 76. This force $F_{dva}$ is balanced by the force of regulator spring 75 biasing the dump valve assembly downward, as seen in FIG. 2. The spring 75 is calibrated such that the dump valve assembly starts to open when, for example, $P_{39}$ equals five (5) pounds per square inch gage. In the embodiment illustrated, the orifice 87 and the sized conduit 91 are designed so that $P_{79}$ is approximately equal to $0.1P_{39}$ during the normal mode of operation.

In the dump mode, which is desired when the temperature in the reactor, for example, begins to exceed a predetermined desired operating temperature, the thermostat element 93 will sense this increase in reactor temperature to move the throttle valve 92 into a position to restrict or block the end of the sized conduit 91 thereby interrupting the flow of air from lower chamber 79 through this sized conduit to the atmosphere. The pressure $P_{79}$ in the lower chamber 79 will then tend to become equalized with the pressure $P_{39}$ in passage 39. By making the area of the diaphragm 76 much greater than the area of the valve 46, this pressure regulator then becomes much more sensitive to the pressure in chamber 79 acting on the diaphragm 76 than the pressure in passage 39 acting on the effective working area of the dump valve 46. Thus, as the flow from sized conduit 91 is restricted by the throttle valve 92 and the pressure in the bottom chamber 79 begins to increase, the pressure force $P_{79}A_{76}$ causes the valve to open further. The net effect is that dump valve can now regulate the flow of air through passage 39 at a much lower pressure than, for example, five (5) pounds per square inch gage. This lower working pressure can be adjusted as desired by properly sizing the orifice 87 and the relative working areas of the dump valve 46 and diaphragm 76 so that with increased reactor temperatures, air pressure regulation of the flow of air to the reactor can be affected to a pressure of, for example, one and one-half (1.5) pounds per square inch gage.

With the above described dump valve arrangement, the flow of air from air pump 18 to the exhaust reactor system can be controlled as a function of reactor back pressure in passage 39 so that under normal engine operating conditions, sufficient air is supplied, as desired, to the reactor to limit the discharge of undesirable constituents from the engine exhaust system, with any excess air from the air pump being discharged to the atmosphere.

In the event the engine opeating conditions are changed so that excessive amounts of unburned materials are discharged from the engine combustion chambers and a normal supply of air is injected from the air pump 18 into the exhaust reactor system, the combustion of these unburned materials in the exhaust system will raise the temperature within the exhaust system. If this continues for a period of time, an excessive temperature rise will occur within the exhaust system so as to cause damage to components, such as the catalytic converter, of such a system. However, this is prevented in the above described apparatus since, as the temperature in the exhaust system increases, the thermostatic control system will sense this temperature change to throttle the flow of air from the pressure actuated dump valve assembly, as previously described, to effect control of the air flow to the reactor system at a lower pressure than under normal operating conditions. This has the effect of reducing the quantity of air injected into the reactor system to limit combustion of the unburned materials therein thereby limiting the temperature rise within the exhaust reactor system to a predetermined safe upper temperature limit.

What is claimed is:

1. In an exhaust reactor system for an internal combustion engine having an induction passage, an exhaust manifold means defining a combustibles flow path of the exhaust reactor system, an air pump, a reactor air flow control valve including a housing providing a first passage connectable to said air pump and to said exhaust manifold means to supply air directly to said combustibles flow path, a second passage in said housing to supply air from the air pump to said induction passage, an induction passage pressure actuated valve in said second passage means for controlling the flow of air to said induction passage, a third passage in said housing for dumping air from the air pump to the atmosphere, a dump valve positioned in said third passage to control the flow of air therethrough and pressure responsive means operatively connected to said dump valve to effect operation of said dump valve as a function of the air pressure from said air pump.

2. In an exhaust reactor system according to claim 1 wherein said pressure responsive means includes a diaphragm operatively connected to said dump valve and defining with said housing a first chamber open to the atmosphere and a second chamber, means in said housing providing a restricted passage for air flow from said air pump to said second chamber, an exhaust temperature responsive means providing a variable restricted passage for air flow from said second chamber to the atmosphere and, spring means in said first chamber acting on said pressure responsive means to normally close said dump valve.

3. In an exhaust reactor system according to claim 1 wherein said induction passage pressure actuated valve includes a gulp valve positioned in said second passage to control the flow of air therethrough, a second diaphragm operatively connected to said gulp valve and forming with said housing a third chamber and a fourth chamber, conduit means extending from said third chamber and connected to said induction passage to subject said third chamber to the pressure in said induction passage, a timing valve means providing a restricted passage for air flow from said third chamber to said fourth chamber to gradually effect a balance of pressure on opposite sides of said diaphragm so that said gulp valve is opened by said diaphragm only for a predetermined interval of time, and spring means operatively connected to said gulp valve to normally bias said gulp valve to a closed position.

4. In an exhaust reactor system for an internal combustion engine having an induction passage, an exhaust manifold means defining a combustibles flow path from the engine, an air pump, a reactor air flow control valve including a housing defining a manifold passage means having an inlet connected to said air pump, a first outlet connected to said exhaust manifold means, a second outlet connected to said induction passage and a third outlet in communication with the atmosphere, an induction passage pressure actuated valve controlling the flow of air from said inlet to said second outlet, a valve positioned to control the flow of air from said inlet to said third outlet and pressure responsive means operatively connected to said valve to effect operation of said valve as a function of air pressure from said air pump.

5. An exhaust reactor system according to claim 4 wherein said pressure responsive means includes a diaphragm operatively connected to said valve, said diaphragm forming with said housing a first chamber open to the atmosphere and a second chamber, means in said housing providing a restricted passage for air flow from said air pump to said second chamber, an exhaust temperature responsive means providing a variable restricted passage for air flow from said second chamber to the atmosphere and, spring means in said first chamber acting on said diaphragm to normally close said valve.

6. In an exhaust reactor system according to claim 5 wherein said induction passage pressure actuated valve includes a gulp valve positioned in said second passage to control the flow of air therethrough, a second diaphragm operatively connected to said gulp valve and forming with said housing a third chamber and a fourth chamber, conduit means extending from said third chamber and connected to said induction passage to subject said third chamber to the pressure in said induction passage, a timing valve means providing a restricted passage for air flow from said third chamber to said fourth chamber to gradually effect a balance of pressure on opposite sides of said diaphragm so that said gulp valve is opened by said diaphragm only for a predetermined interval of time, and spring means operatively connected to said gulp valve to normally bias said gulp valve to a closed position.

7. A reactor air flow control valve for use in the exhaust reactor system of an internal combustion engine having an induction passage, an exhaust manifold means defining a portion of a combustibles flow path, an air pump, first conduit means adapted to supply air to the combustibles flow path in the exhaust manifold means and second conduit means adapted to supply air to the induction passage, said control valve including a housing providing an air manifold passage means including a first passage adapted to supply air from the air pump to the first conduit means, a second passage adapted to supply air from the air pump to the second conduit means and a third passage adapted to dump air from the air pump to the atmosphere, a normally closed gulp valve controlling the flow of air through said second passage, induction pressure responsive means connected to said gulp valve to effect opening of said gulp valve as a function of a predetermined low vacuum signal received from the induction passage, a dump valve positioned in said third passage to control the flow of air therethrough, said housing further defining a chamber, pressure responsive means operatively connected to said dump valve and dividing said chamber into a first chamber open to the atmosphere and a second chamber, spring means in said first chamber acting on said pressure responsive means to normally close said dump valve, means providing a restricted passage for air flow from said first passage to said second chamber, and exhaust temperature responsive means providing a variable restricted passage for air flow from said second chamber to the atmosphere.

8. A reactor air flow control valve according to claim 7 wherein said pressure responsive means is a diaphragm and wherein said exhaust temperature responsive means providing a variable restricted passage includes a sized conduit in communication at one end with said second chamber and at its other end to the atmosphere, a thermostat positioned adjacent said other end with its fixed end in thermal contact with the exhaust manifold means and a throttle valve fixed to the free end of said thermostat and movable therewith relative to said other end from an unrestricted flow position at low exhaust temperatures to a restricted flow position at higher exhaust temperatures.

9. A reactor air flow control valve for use in the exhaust reactor system of an internal combustion engine having an induction passage and an exhaust manifold means defining a portion of a combustibles flow path, an air pump, first conduit means adapted to supply air to the combustibles flow path and second conduit means adapted to supply air to the induction passage, said reactor air flow control valve comprising a housing, a first passage through which air can flow and including an inlet and a discharge, said inlet being connected to the output of the air pump and said discharge being adapted for connection to the first conduit means, a gulp valve controlled passage in said housing in communication at one end with said passage and adapted at its other end for connection to said second conduit means and induction pressure responsive means connected to said gulp valve to operate said gulp valve as a function of a vacuum signal from the induction passage, and dump valve controlled passage means in said housing connected at one end to said passage and at its other end in communciation with the atmosphere, said housing further defining a chamber, pressure responsive means dividing said chamber into a first chamber and a second chamber, said pressure responsive means being operatively connected to said dump valve, said first chamber being in communication with the atmosphere, an orifice controlled passage in said housing connecting said first passage to said second chamber, a vent opening into said second chamber for the discharge of air therefrom, and a thermostatically operated throttle valve positioned to control the flow of air through said vent opening with full venting being effected at temperatures below a predetermined value with flow through said vent opening being restricted at temperatures above a certain value whereby said pressure responsive means effects opening of said dump valve as a function of temperature and exhaust manifold pressure.

10. A reactor air flow control valve according to claim 9 wherein said induction pressure responsive means includes a second diaphragm operatively connected to said gulp valve and forming with said housing a third chamber and a fourth chamber, conduit means connecting said third chamber to said induction passage, a timing valve providing a restricted passage for air flow from said third chamber to said fourth chamber to gradually effect a balance of pressure on opposite sides of said diaphragm and, spring means operatively connected to said gulp valve to normally bias said gulp valve to a closed position.

* * * * *